(No Model.)
D. L. RICHMOND.
FEED BOX AND MANGER.
No. 556,900.                    Patented Mar. 24, 1896.
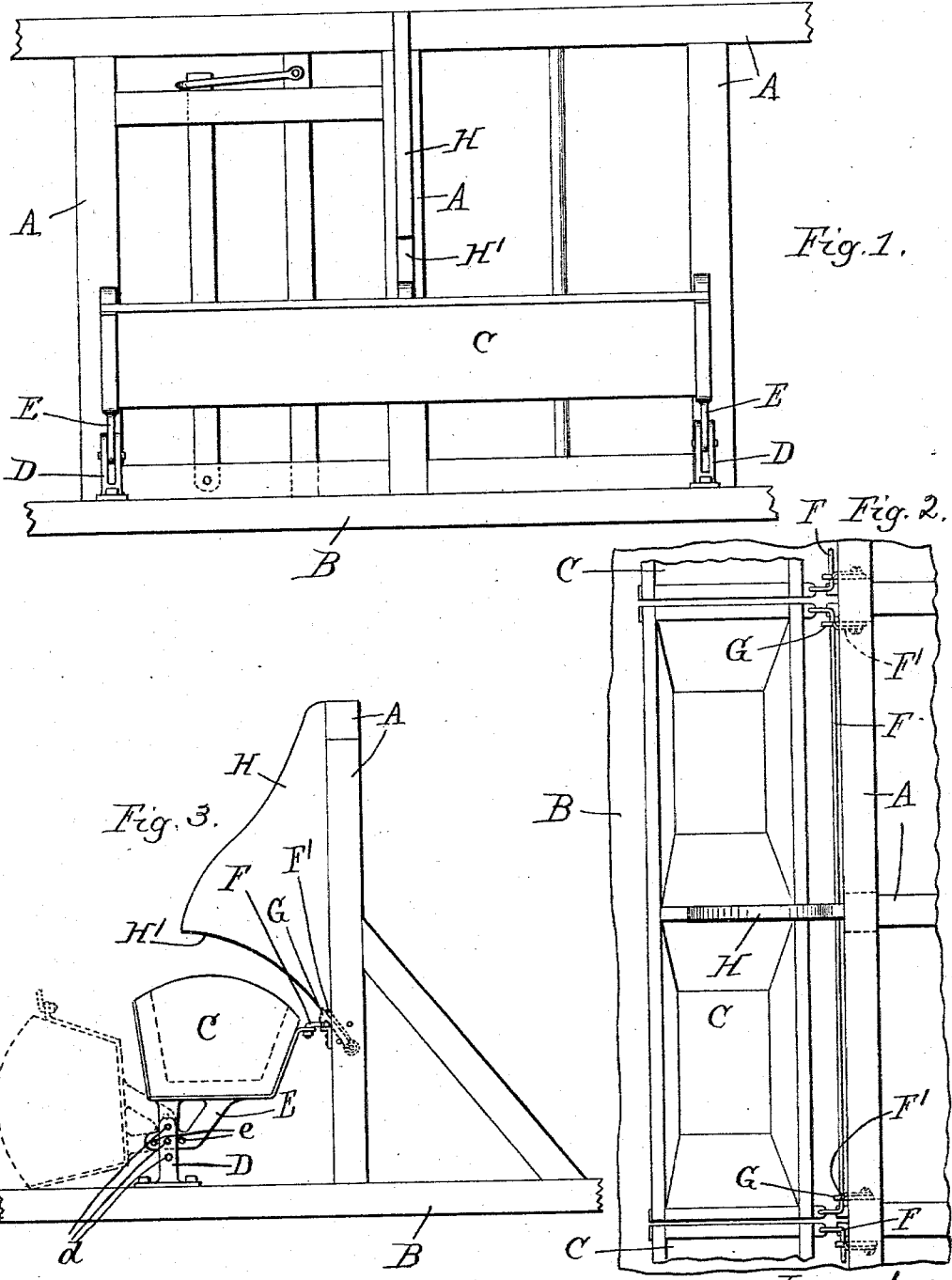
Witnesses:
E. T. Wray
Jean Elliott
Inventor.
Don. L. Richmond

UNITED STATES PATENT OFFICE.

DON L. RICHMOND, OF WHEELER, INDIANA.

FEED-BOX AND MANGER.

SPECIFICATION forming part of Letters Patent No. 556,900, dated March 24, 1896.

Application filed December 2, 1895. Serial No. 570,778. (No model.)

*To all whom it may concern:*

Be it known that I, DON L. RICHMOND, a citizen of the United States, residing at Wheeler, county of Porter, and State of Indiana, have invented certain new and useful Improvements in an Animal Feed-Box and Manger, which are fully set forth in the following specification, reference being had to the accompanying drawings, forming a part thereof.

The purpose of this invention is to provide a combined feed-box and manger having the characteristic that the feed-box is readily swung out of position of use when hay or other feed requiring a manger rather than a box is to be fed, so that the feed-box will not become littered up with the refuse of the other feed and so that it will in use be at the proper height for feeding grain or other material requiring a box, and when out of position for use as a feed-box shall serve as the manger-wall, requiring, therefore, no other structure than the box and its necessary supports, in combination with the head of the stall, to constitute the manger.

In the drawings, Figure 1 is an elevation looking toward the head of a stall or range provided with my improved feed-box. Fig. 2 is a plan of the same. Fig. 3 is an end view of the feed-box and side view of the range or stall, showing the feed-box in full line in position for use as a box and in dotted line in position to serve as the manger-wall.

A A A are the posts constituting the framework at the head of a range or row of stalls for animals. I have shown two customary forms merely to indicate the adaptability of my improvements to both forms, and, as will be hereinafter apparent, to any ordinary form of stall. The only feature of these common constructions to be especially noticed in connection with the invention is that when used with my invention they do not require any horizontal barriers, such as are sometimes provided to prevent the animals from crowding themselves through the head of the stall between the stanchions or guards, and this is in itself an advantage, because it leaves the animals perfect freedom of movement of the head up and down without limit, so that they reach the floor, which serves as the bottom of the manger when the box is tilted back, as readily as they reach the bottom of the box when it is in the position of use.

B is the barn-floor, which I have shown upon a continuous level both behind and in front of the head of the stall or range, though my invention, as will hereinafter appear, is adapted for situations in which the level is different at different points.

C is the feed-box. It is preferably made in the most convenient and customary form of boxes for such purpose, in this respect that the sides and ends slope in toward the bottom to make it easy for the animal to reach the corners at the bottom and clean out the contents of the box.

D D are standards secured to the floor beyond the head of the stall or range, and the feed-box C is provided with brackets E E at the ends underneath the bottom, by which the box is pivoted to the standards D D.

F is a rail which is most conveniently made from a round metal rod, which is rigidly secured to the box, so that it stands a few inches forward of its forward edge, its purpose being to afford a stop for the forward side of the box against the head of the stall, and also a means of latching or locking the box in that position, so that the animal shall not be able to tilt it back to the dotted-line position. When the box is at horizontal position for use and the rail F is stopped against the posts, the rail is engaged with the automatic catches G G, which may be of any form adapted to engage the rail automatically as the box swings in against the posts. I have shown them in the form of tapering-nosed hooks pivoted on the posts, adapted to lock downward over the rail F. They may, if necessary, be provided with springs F' to hold them in engagement with the rod, or they may be engaged by gravity alone. In any event they must be disengaged by hand when the attendant desires to tilt the feed-box backward to convert it into a rear wall for the manger. When thus tilted back to the position shown in dotted line in Fig. 3, the edge which is the upper edge when the box is horizontal rests upon the floor. In this position the bottom of the box, becoming the rear wall of the manger, should be at least vertical—that is, should not incline forward, though it may incline somewhat rearward. The box must therefore swing through an angle of at least ninety degrees, since the bottom is horizontal in the upper position of the box. In order that the box may have this range of movement about its fulcrum or pivotal support, it will be understood that the pivotal line must be located as far above the level at which the rear edge of the box is stopped when it is turned back as said rear edge is rearward of the pivotal line when the box is horizontal. In order, therefore, that the device may be adaptable to different situations, in some of which the floor may be at one level throughout, as shown in the drawings, while in others the floor on which the edge of the box is stopped when it is turned back may be higher or lower than it is at the point where the standards D are secured, I provide a plurality of holes $d$ and $e$ in the standards D and brackets E, respectively, at which pivotal connection between the brackets and standards may be made, the holes in the bracket being in a horizontal row—that is, parallel with the bottom of the box—while the holes in the standards are in a vertical row, so that when the lowest hole has to be used on the standard the rearmost hole may be used with it on the bracket, and if a higher hole has to be selected on the standard a hole correspondingly farther forward on the bracket may be selected and used with it.

I do not limit myself absolutely to the use of brackets and standards in the form shown, nor to pivotal supports located under the ends only of the box, but such structure has the advantage of affording facility for the variety of adjustments above indicated, being therefore adaptable to a variety of situations.

In long ranges or rows of stalls adjacent boxes will be arranged to meet end to end in line with the middle posts, so that they may both be stopped on and locked to the same post, as indicated in Fig. 2.

When it is considered desirable to partition the space beyond the head of the stall—that is, over the feed-boxes or manger—to prevent cattle from interfering with each other at that point, partitions or guards (of which one is represented in the drawings, indicated by the letter H) are secured to the middle post A of the stall and project therefrom in the vertical plane of division between consecutive feed-boxes. In order that such partitions or guards may not interfere with the tilting of the feed-box, as described, they are cut away at the lower edge H′ to conform approximately to the path of the forward edge or rail of the feed-box—that is, approximately in an arc about the pivotal axis of the box.

I claim—

1. In combination with an animal stall or range a feed-box pivoted beyond the head of the stall or range at a line remote from the bottom of the box below the same, and forward of the rear edge, and above the floor; and adapted to be tilted over such pivot backward and downward through substantially ninety degrees to bring its rear edge to the level of the floor, whereby when tilted back it forms a rear wall for the manger whose height is the width of the box and whose width is greater than that width.

2. In combination with an animal-stall, the feed-box at the head thereof having the brackets E extending downward from the bottom at the ends; the fixed standards D, to which said brackets are adapted to be pivoted, the standards having a plurality of pivot-holes in vertical line and the brackets having a corresponding plurality of pivot-holes in horizontal line, whereby the pivotal point may be selected to adapt the box, when tilted rearward, to stop at desired position.

3. In combination with an animal stall or range having the feed-box pivotally secured beyond the head of the stall or range and adapted to be tilted down backward from horizontal position near the head of the stall backward to approximately vertical position, a partition or guard secured to the head of the stall, and projecting thence in a vertical plane above the feed-box, the lower edge of such partition or guard being cut substantially to conform to the path described by the forward edge of the box in the tilting movement of the latter.

In testimony whereof I have hereunto set my hand, in the presence of two witnesses, at Chicago, Illinois, this 29th day of November, 1895.

DON L. RICHMOND.

Witnesses:
CHAS. S. BURTON,
JEAN ELLIOTT.